United States Patent [19]

Masse

[11] Patent Number: 5,712,748
[45] Date of Patent: Jan. 27, 1998

[54] SLIDER-SUSPENSION IN A DISC DRIVE

[75] Inventor: Robert Wayne Masse, Rosemount, Minn.

[73] Assignee: Seagate Technology, Inc., Scotts Valley, Calif.

[21] Appl. No.: 661,599

[22] Filed: Jun. 11, 1996

[51] Int. Cl.$^6$ .................................... G11B 5/48
[52] U.S. Cl. ............................................ 360/104
[58] Field of Search ............................ 360/106, 104, 360/105, 107, 108

[56] References Cited

U.S. PATENT DOCUMENTS

| | | | |
|---|---|---|---|
| 3,931,641 | 1/1976 | Watrous | 360/104 |
| 4,167,765 | 9/1979 | Watrous | 360/103 |
| 4,317,149 | 2/1982 | Elser et al. | 360/126 |
| 4,761,699 | 8/1988 | Ainslie et al. | 360/103 |
| 4,800,454 | 1/1989 | Schwarz et al. | 360/103 |
| 4,841,395 | 6/1989 | Craft | 360/103 |
| 4,972,286 | 11/1990 | Jurisch et al. | 360/126 |
| 5,001,583 | 3/1991 | Matsuzaki | 360/104 |
| 5,001,591 | 3/1991 | Nakashima | 360/126 |
| 5,048,175 | 9/1991 | Jursich et al. | 29/603 |
| 5,142,425 | 8/1992 | Gailbreath, Jr. et al. | 360/123 |
| 5,282,102 | 1/1994 | Christianson | 360/104 |
| 5,296,983 | 3/1994 | Blanc et al. | 360/104 |
| 5,305,167 | 4/1994 | Nagase et al. | 360/104 |
| 5,422,764 | 6/1995 | McIlvanie | 360/97.01 |

FOREIGN PATENT DOCUMENTS

| | | |
|---|---|---|
| 54-102111 | 8/1979 | Japan. |
| WO 93/14495 | 7/1993 | WIPO. |

OTHER PUBLICATIONS

Watrous, R.B., "Magnetic Head Suspension Assembly," IBM Technical Disclosure Bulletin, vol. 24, No. 10 (Mar. 1982), p. 4915.

*Primary Examiner*—Stuart S. Levy
*Assistant Examiner*—David D. Davis
*Attorney, Agent, or Firm*—Westman, Champlin, & Kelly, P.A.

[57] ABSTRACT

A slider-suspension assembly for a magnetic disc drive is provided. The slider-suspension assembly includes a slider and a gimbal that is electrically coupled to electrical ground and bonded to the slider. The gimbal includes a pair of struts and a cross-member. The struts and cross-member define an open portion of the gimbal. A support extends from the cross-member and protrudes into the open portion. The gimbal is bonded to the slider at the support. The gimbal also includes a shear tab which includes a fountain. A conductive adhesive is deposited on the shear tab and within the fountain for electrically coupling the gimbal to the slider.

16 Claims, 3 Drawing Sheets

SLIDER-SUSPENSION IN A DISC DRIVE

BACKGROUND OF THE INVENTION

This invention relates to slider-suspension assemblies for data recording discs. In particular, the invention relates to an improved slider-suspension assembly electrically connecting the slider to the suspension.

Disc drives are the primary devices employed for mass storage of information such as computer programs and data. The advantages of disc drive technology over other means of data storage include lower cost per unit of storage capacity and a generally higher transfer rate. Disc drives utilize at least one rotatable disc with concentric data tracks containing the information, a transducer for reading information from or writing information to the various tracks, and a transducer-positioning actuator connected to the transducer for moving it to the desired track and maintaining it over the track during read or write operations. The transducer is attached to a slider having an air bearing surface that is supported adjacent the data surface of the disc by a cushion of air generated by the rotating disc. The slider is attached on its backside, i.e., the side opposite the air bearing surface, to the suspension, and the suspension is attached to a support arm of the transducer positioning actuator.

The suspension provides dimensional stability between the slider and actuator arm, controlled flexibility in pitch and roll motion of the slider relative to its direction of motion on the rotating disc, and resistance to yaw motion. The suspension typically provides a load or force against the slider that is compensated by the force of the air bearing between the slider's air bearing surface and the disc surface. The slider is maintained in close proximity to, but out of contact with, the data surface of the disc. The suspension typically comprises a load beam, which is mounted at one end to the actuator arm at a base plate, and a gimbal element which is attached to the other end of the load beam and supports the slider. The load beam provides the resilient spring action which biases the slider toward the surface of the disc, while the gimbal provides flexibility for the slider as the slider rides on the cushion of air between the air bearing surface and the rotating disc.

The fabrication of such a slider-suspension is time consuming and costly. In the conventional slider-suspension assemblies, the slider is mechanically attached to the gimbal by epoxy binding. The electrical connection between the transducer and the disc file read/write electronics is made by wires which run the length of the suspension and extend over the slider. The ends of the wires can be soldered or ultrasonically bonded in a known manner to the transducer leads on the slider.

Many factors must be considered in bonding the gimbal to the slider. For example, the bond must not affect the flying characteristics of the slider-suspension assembly. The slider must have a predetermined pitch and roll that is typically controlled by the configuration of the slider, the gimbal, and the connection between the two. Thus, a manufacturer does not have much latitude in the application of the epoxy bond. Also, heat generated during the operation of the disc drive and the different thermal expansion coefficients of the gimbal and slider create other constraints on the size and type of bond sufficient for use in making the connection.

A disadvantage with epoxy bonding is that because the epoxy is structural and thus non-conductive, there is no consistent grounding path between the slider and the suspension. In the event of static charge build-up on the slider, the closest path for discharge is from the pole tips of the transducer to the disc surface. Static discharge through this path will destroy a thin film transducer or portions of the disc surface.

Typically, the suspension is in electrical contact with electrical ground at the disc drive chassis. In order to dissipate charges from the slider to the ground, the prior art has applied a conductive adhesive in place of the epoxy bond. However, the bonds in several slider-suspension assemblies require adhesives to have certain thermal characteristics and strength characteristics not found in available conductive adhesives. Thus, replacing non-conductive epoxy with conductive adhesives is not a suitable option of general applicability. Additionally, the prior art has applied an additional fillet of conductive adhesive to the slider-suspension assembly. This solution is not possible in slider-suspension assemblies configured in such a manner where a fillet alone will adversely affect the flying characteristics of the assembly.

SUMMARY OF THE INVENTION

The present invention is directed to a slider-suspension assembly for a magnetic disc drive. The slider-suspension assembly includes a slider and a gimbal that is electrically coupled to electrical ground and bonded to the slider. The gimbal includes a pair of struts and a cross-member. The struts and cross-member define an open portion of the gimbal. A support extends from the cross-member and protrudes into the open portion. The gimbal is bonded to the slider at the support. The gimbal also includes a shear tab which includes a fountain. A conductive adhesive is deposited on the shear tab and within the fountain for electrically coupling the gimbal to the slider.

DETAILED DESCRIPTION OF THE PREFERRED EMBODIMENTS

Figure 1:
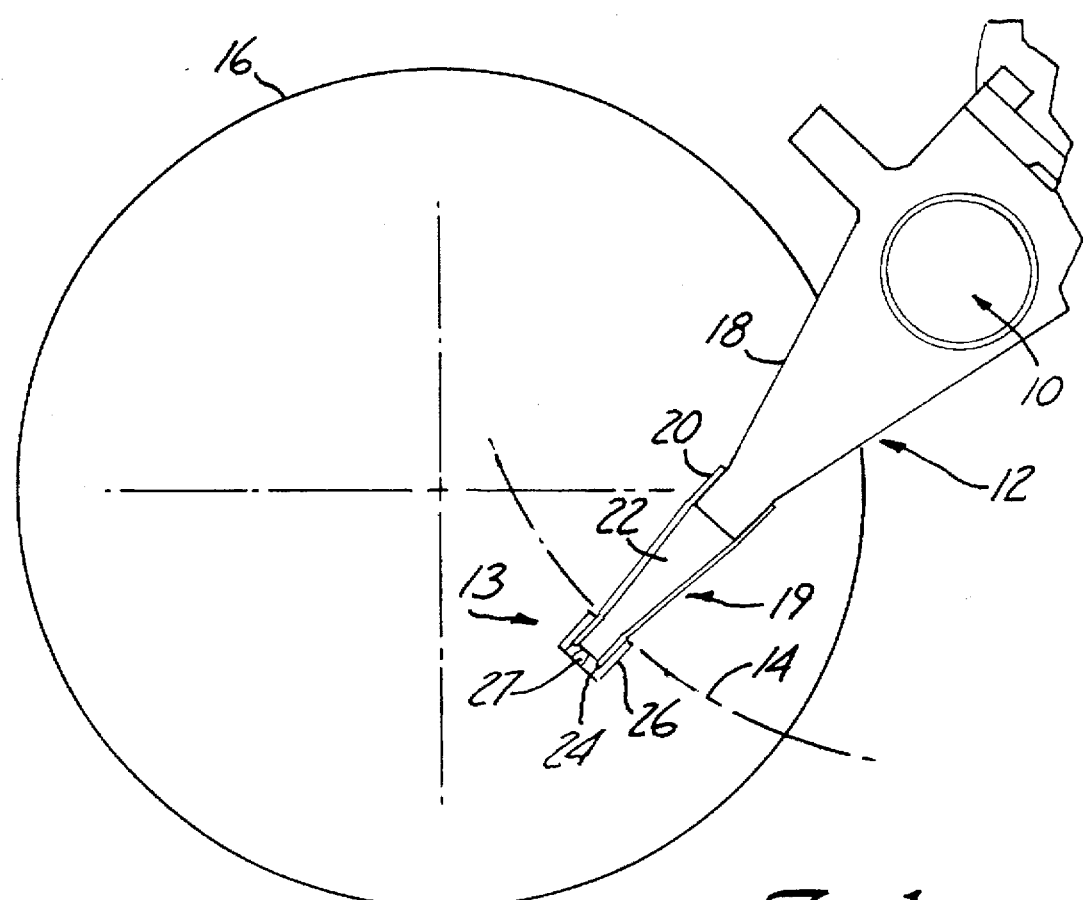
FIG. 1 is a plan view of a portion of a magnetic disc drive having a slider-suspension assembly embodying features of the present invention over a magnetic disc.

FIG. 1 illustrates an actuator 10 and an actuator arm 12 which supports a slider-suspension assembly 13 over a magnetic disc 16. The actuator 10 positions the arm 12 along an arc 14 over the magnetic disc 16. The arm 12 includes a supporting arm 18, and a suspension 19 having a base plate 20, a load beam 22, and a gimbal 24. The slider-suspension assembly 13 includes a slider 26 bonded to the gimbal 24. The arm 12 is known as the rotary actuating arm because the actuator 10 rotates the arm 12 to position the slider 26 along the arc 14. The suspension 19 is electrically connected to the arm 12 which is electrically connected to electrical ground, i.e., typically to the chassis (not shown), in a manner well known in the art.

Figure 2:
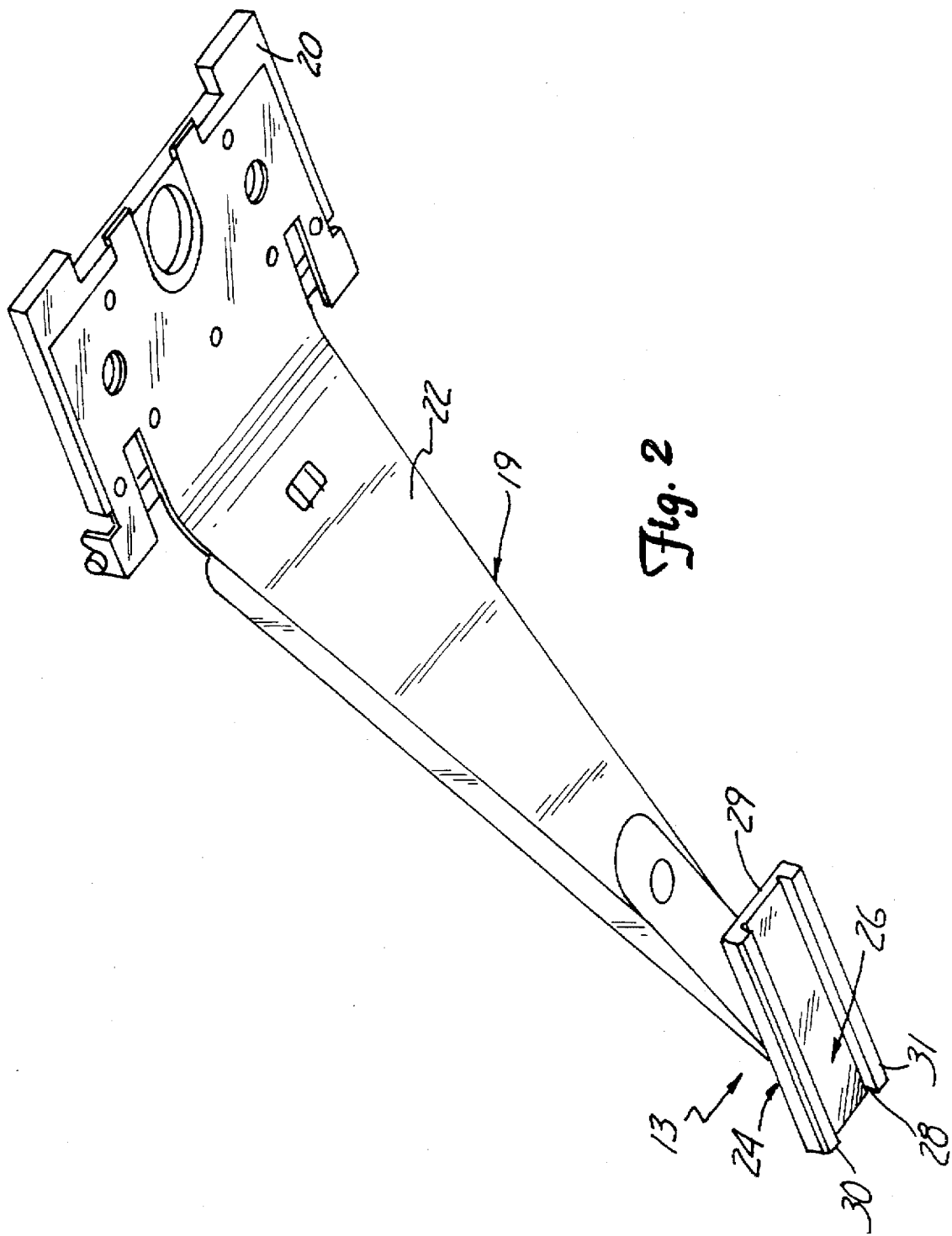
FIG. 2 is a perspective view of the suspension and slider-suspension assembly of FIG. 1.

FIG. 2 is a perspective view of the suspension 19 supporting the slider-suspension assembly 13, as viewed from beneath with respect to FIG. 1. The gimbal 24 resiliently supports the slider 26 over the disc 16. As the disc rotates, the slider 26 flies over the surface of the disc 16. The gimbal 24 allows the slider 26 to pitch and roll while the slider 26 follows the topography of the disc 16. The load beam 22 provides a resilient spring action which biases the slider toward the disc 16. A transducer (not shown) is attached to the slider 26 for reading information from and writing information to the disc 16. FIG. 2 shows the air bearing surface 28 of the slider 26 and includes rails 30, 31. The backside 29 of the slider 26 is opposite the air bearing surface 28. The suspension 19 is attached to the slider 26 at the backside surface 29.

Figure 3:
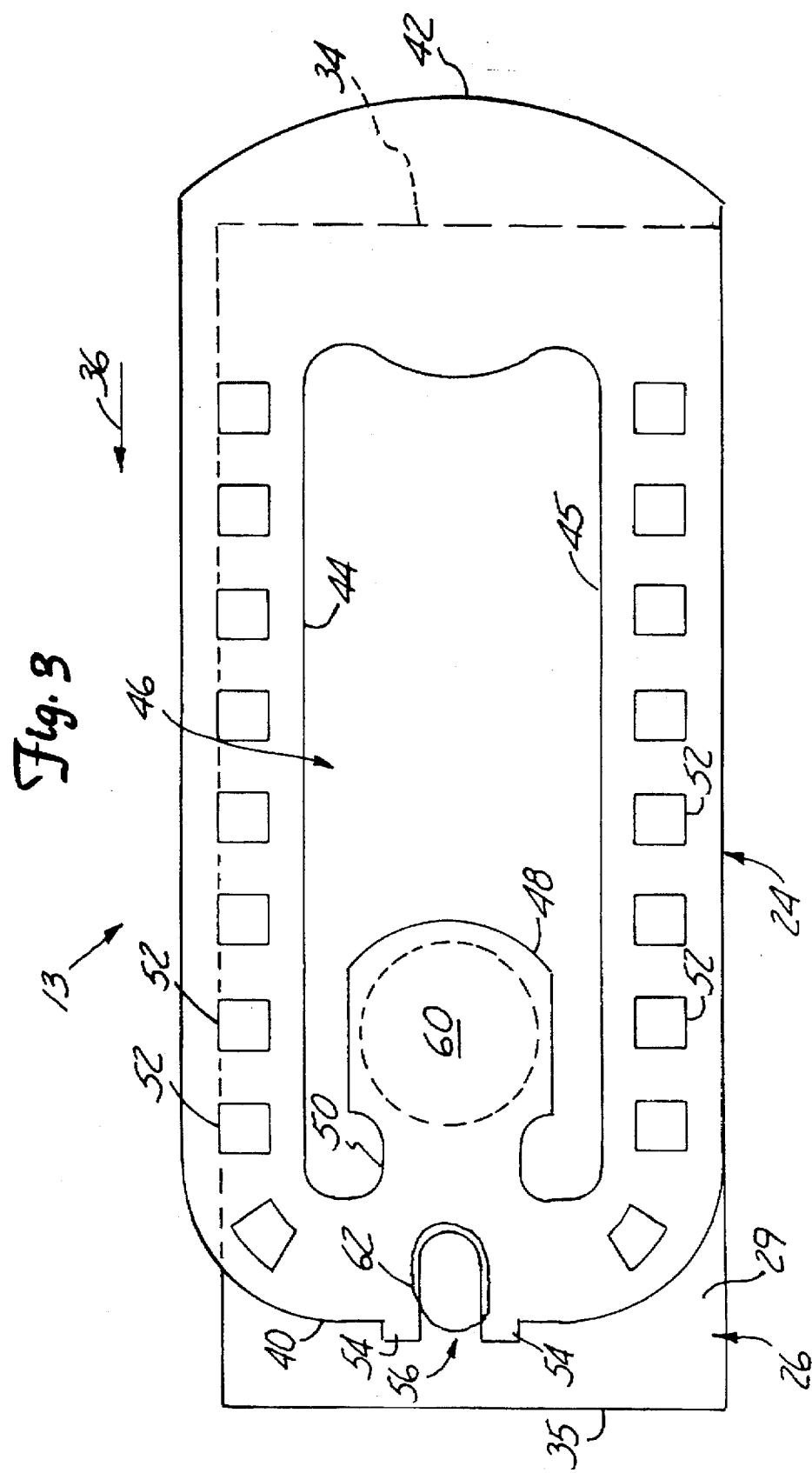
FIG. 3 is a modified top view of the slider-suspension assembly of FIG. 1.

FIG. 3 is an enlarged top view of the slider-suspension assembly 13 of FIG. 1 with the load beam 22 removed for clarity. FIG. 3 shows the backside 29 of the slider 26 attached to the gimbal 24. The slider 26 is preferably formed of a ceramic material such as a mixture of Alumina ($Al_2O_3$) and titanium carbide (TiC). The slider 26 can include an overcoat formed of a material such as Diamond Like Carbon (DLC) now known to those skilled in the art. The backside 29 is generally planar and the slider 26 includes generally perpendicular edges, among which are the leading edge 34 and trailing edge 35, with reference to the direction of the rotation of the disc (shown as arrow 36). Typically, the transducers (not shown) are located on the trailing edge 35 of the slider 26.

The gimbal 24 is preferably formed of 302/304 series stainless steel, and includes a trailing member 40, a leading member 42 and two struts 44, 45 connecting the trailing member 40 to the leading member 42 and defining an open portion 46. A support 48 extends into the open portion 46 and is connected to the trailing member 40 by a neck 50. A plurality of apertures, indicated generally at 52, are etched into the struts 44, 45. A shear tab 54, or protuberance, extends from the trailing member opposite the neck 50, and includes a fountain 56, or slot, formed or etched at the shear tab 54 and trailing member 40, i.e., in the gimbal 24.

The gimbal 24 is bonded to the slider 26 so that the struts 44, 45 run generally parallel with the sides of the slider 26. An adhesive bond is formed at the support 48 preferably in the region indicated by the dotted line 60, and defined generally as the gimbal bond region 60. The gimbal bond region 60 is preferably limited to the support 48 and neck 50 such that the adhesive does not adversely affect the flying characteristics of the slider 26. For example, the struts 44, 45 are not bonded to the slider 26 and preferably control the roll static attitude of the slider-suspension assembly 13 during flight. The preferred epoxy used to bond the slider 26 to the gimbal 24 at the support 48 is non-conductive and sold under the tradename Hysol material 9430NG by the Dexter Corp. of Seabrook, N.H.

The electrical connection between the slider 26 and gimbal 24 is typically not sufficient to dissipate charge built up on the slider 26. A conductive adhesive 62 is applied to the slider 26 at the portion exposed by the fountain 56 to electrically connect the slider 26 to gimbal 24 at the trailing member 40 and the shear tab 54. The preferred conductive adhesive 62 is manufactured by Abelstick Labs of Orange County, Calif. under the tradename Ablebond 161LV. In the preferred embodiments, the gimbal 26 is between about 0.04932–0.080 inches (1.252–2.032 mm) in length (i.e., from shear tab 54 to leading member 42); and between about 0.0394–0.063 inches (1.001 and 1.600 mm) in width (i.e., as measured between the struts 44, 45). In the preferred embodiment, the shear tab 54 extends about 0.003 inches (0.0762 mm) from the trailing member 40. The fountain 56 is about 0.007 inches (0.1778 mm) wide and about 0.0104 inches (0.2642 mm) deep at its longest point.

Ambient fly height of the slider-suspension assembly 13 of the present invention was measured at both the innermost track and the outermost track. The results showed no appreciable difference from the fly height of the slider-suspension assembly of the prior art. Gimbal bond pull strength was measured to examine the effects of the conductive adhesive. The operator was unable to break the bond, and the gimbal yielded before the adhesive bond would yield. Also, the slider-suspension assembly 13 shows no significant change in thermal performance from the slider of the prior art. Additionally, the slider-suspension assembly 13 of the present invention showed no appreciable difference in resonance, or head slap, from the slider-suspension assembly of the prior art. Thus, the present invention provides for an inexpensive means for dissipating charge from the slider to protect the transducer and magnetic disc. The slider-suspension assembly 13 of the present invention shows no adverse characteristics from the prior art which has had relative difficulty in making modifications to existing sliders that do not degrade performance. Additionally, the fountain can also provide for visual or mechanical alignment of the load beam 22.

Although the present invention has been described with reference to preferred embodiments, workers skilled in the art will recognize that changes may be made in form and detail without departing from the spirit and scope of the invention.

What is claimed is:

1. A slider-suspension assembly for a magnetic disc drive, the slider-suspension assembly comprising:
   a slider;
   a gimbal electrically coupled to electrical ground and bonded to the slider, the gimbal having:
   a pair of struts and a cross-member connected to the struts, the struts and cross-member defining an open portion; the struts are in abutting contact with the slider and not adhered thereto;
   a support extending from the cross-member and protruding into the open portion wherein the support is bonded to the slider;
   a shear tab, opposite the cross-member from the support, extending from the cross-member and having a slot defined in the shear tab and cross-member, wherein the support is substantially larger than the shear tab; and
   a conductive adhesive deposited on the shear tab and within the slot for physically and electrically coupling the gimbal to the slider so as to dissipate charge built up on the slider.

2. The slider-suspension assembly of claim 1 wherein the struts include a plurality of apertures formed therein for affecting the flight characteristics of the slider-suspension assembly.

3. The slider-suspension assembly of claim 1 wherein the open portion is further defined by a leading member extending between and connected to the struts.

4. The slider-suspension assembly of claim 1 wherein the slider includes a plurality of sides and trailing and leading edges wherein the struts run generally parallel along the sides, and the cross-member is proximate the trailing edge.

5. The slider-suspension assembly of claim 4 wherein the open portion is further defined by a leading member extending between and connecting the struts.

6. The slider-suspension assembly of claim 5 wherein the shear tab extends from the cross-member opposite the support.

7. The slider-suspension assembly of claim 1 wherein the shear tab extends from the cross-member opposite the support.

8. A slider-suspension assembly of claim 1 wherein the support is bonded to the slider with a first amount of adhesive, wherein the conductive adhesive has a second amount of adhesive, and wherein the first amount of adhesive is substantially greater than the second amount of adhesive.

9. The slider-suspension assembly of claim 1 wherein the length of the struts is greater than the length of the cross-member.

10. A magnetic disc drive system, comprising:

a magnetic storage disc; and an actuator arm having a suspension electrically connected to electrical ground and coupled to the actuator arm;

wherein the suspension includes:

a slider suspension assembly opposite the actuator arm and having:

a slider;

a gimbal electrically coupled to electrical ground and bonded to the slider, the gimbal having:

a pair of struts and a cross-member connected to the struts, the struts and cross-member defining an open portion; the struts are in abutting contact with the slider and not adhered thereto;

a support extending from the cross-member and protruding into the open portion wherein the support is bonded to the slider;

a shear tab, opposite the cross-member from the support, extending from the cross-member and having a slot defined in the shear tab and cross-member, wherein the support is substantially larger than the shear tab; and a conductive adhesive deposited on the shear tab and within the slot for physically and electrically coupling the gimbal to the slider so as to dissipate charge built up on the slider.

11. The magnetic disc drive system of claim 10 wherein the struts extend from and are generally perpendicular to the cross-member.

12. The magnetic disc drive system of claim 11 wherein the struts are not bonded to the slider and affect the flight characteristics of the slider-suspension assembly.

13. The magnetic disc drive system of claim 10 wherein the suspension includes a base plate for connecting the suspension to the actuator arm, and a load beam for connecting the slider-suspension assembly to the base plate.

14. A slider-suspension assembly for a magnetic disc drive, the slider-suspension assembly comprising:

a slider;

a gimbal electrically coupled to electrical ground and bonded to the slider, the gimbal having:

a pair of struts and a cross-member connected to the struts, the struts and cross-member defining an open portion; the struts are in abutting contact with the slider and not adhered thereto;

a support extending from the cross-member and protruding into the open portion wherein the support is bonded to the slider; and a protuberance, opposite the cross-member from the support, extending from the cross-member and having a slot defined in the protuberance wherein the support is substantially larger than the protuberance; and a conductive adhesive deposited on the protuberance and within the slot for physically and electrically coupling the gimbal to the slider so as to dissipate charge built up on the slider.

15. The slider-suspension assembly of claim 14 wherein the struts include a plurality of apertures formed therein for affecting the flight characteristics of the slider-suspension assembly.

16. The slider-suspension assembly of claim 14 wherein the open portion is further defined by a leading member extending between and connected to the struts.

* * * * *